US008386957B2

(12) United States Patent
Chao et al.

(10) Patent No.: US 8,386,957 B2
(45) Date of Patent: Feb. 26, 2013

(54) METHOD FOR DYNAMICALLY SCALING AN ORIGINAL BACKGROUND LAYOUT

(75) Inventors: Hui Chao, San Jose, CA (US); Xuemei Zhang, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 901 days.

(21) Appl. No.: 12/392,516

(22) Filed: Feb. 25, 2009

(65) Prior Publication Data

US 2010/0218089 A1 Aug. 26, 2010

(51) Int. Cl.
*G06F 3/048* (2006.01)

(52) U.S. Cl. ........................................ 715/800; 715/252

(58) Field of Classification Search .................. 715/200, 715/243, 252, 788, 800
See application file for complete search history.

(56) References Cited

U.S. PATENT DOCUMENTS

| | | | | |
|---|---|---|---|---|
| 5,917,549 | A * | 6/1999 | Simons et al. | 348/441 |
| 6,161,114 | A * | 12/2000 | King et al. | 715/202 |
| 7,210,099 | B2 * | 4/2007 | Rohrabaugh et al. | 715/249 |
| 2008/0082911 | A1 * | 4/2008 | Sorotokin et al. | 715/236 |
| 2008/0095470 | A1 | 4/2008 | Chao et al. | |
| 2008/0313533 | A1 * | 12/2008 | Hoyer et al. | 715/243 |
| 2009/0307583 | A1 * | 12/2009 | Tonisson | 715/246 |
| 2010/0128181 | A1 * | 5/2010 | Jagmag | 348/581 |
| 2010/0142853 | A1 * | 6/2010 | Fillion et al. | 382/298 |
| 2010/0275153 | A1 * | 10/2010 | Ignatchenko et al. | 715/800 |
| 2011/0113323 | A1 * | 5/2011 | Fillion et al. | 715/252 |
| 2011/0182502 | A1 * | 7/2011 | Liang | 382/162 |

OTHER PUBLICATIONS

Adobe, Using Adobe Photoshop CS4, 2008, Adobe, pp. 1-704 (pdf).*

Avidan, S. et al., "Seam Carving for Content-Aware Image Resizing", ACM Transaction on Graphics, vol. 26, No. 3, Article 10, Jul. 2007.

Rubinstein, M. et al., "Improved Seam Carving for Video Retargeting", ACM Transaction on Graphics, vol. 27, No. 3, Article 16, Aug. 2008.

* cited by examiner

*Primary Examiner* — Manglesh M Patel

(57) ABSTRACT

In a method for dynamically scaling an original background layout having at least one element, an instruction to employ the original background layout in a new page that differs in at least one of size and aspect ratio from at least one of the size and aspect ratio of the original background layout is received. In addition, a type and a position of the at least one element is identified and one or more constraints are applied on at least one characteristic of the at least one element to modify the at least one characteristic of the at least one element for inclusion in the new page, in which the one or more constraints are based upon the type and position of the at least one element.

15 Claims, 9 Drawing Sheets

METHOD FOR DYNAMICALLY SCALING AN ORIGINAL BACKGROUND LAYOUT

CROSS-REFERENCE TO RELATED APPLICATION

The present application shares some common subject matter with commonly assigned U.S. Patent Application Publication Ser. No. 2008/0095470, filed on Oct. 23, 2006 by Hui Chao et al., the disclosure of which is hereby incorporated by reference in its entirety.

BACKGROUND

As digital hardware becomes more readily available, people are personalizing documents in a wide variety of ways. Frequently, documents include images that are designed to be scaled to specific page sizes. For example, people frequently like to incorporate professionally designed borders in their photos, newsletters, postcards, and greeting cards. However, given the multitude of graphic design programs that allow people to resize their documents to any desired size, it would be extremely difficult, if not impossible, for a graphic designer to create different versions of the same design for each possible page size.

Typically, automatic image resizing programs simply scale an original image to fit a new page size without regard to the original design intent of the original image. For example, FIG. 1 depicts an original image 100 that has been resized from an original 4×5 template size to a 4×10 template size (at 102). As shown, the ducks that are used as upper border elements 110 have been stretched to fit the width of the image size, distorting the original proportions and overall look of the ducks. Moreover, depending upon the method used to stretch the image, the relative proportions of the left and right side edge elements to the top and bottom edge elements may be altered, so that instead of having an image with the same size border all around the edge, the left and right side edge elements may be thicker or thinner than the top or bottom edge elements (compare, for instance, $w_1$ with $w_2$). Furthermore, some of the image resizing programs simply crop the portions of the images that do not fit onto the new page size, after enlarging the original image, if necessary. Such cropping often damages the design intent of an image including components such as that shown in FIG. 1.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to an exemplary embodiment thereof. In the following description, numerous specific details are set forth in order to provide a thorough understanding of the present invention. It will be apparent however, to one of ordinary skill in the art, that the present invention may be practiced without limitation to these specific details. In other instances, well known methods and structures have not been described in detail so as not to unnecessarily obscure the present invention.

Disclosed herein is a method for dynamically scaling an original background layout having at least one element that is defined by a predefined design language and a transformation operation that modifies the at least one element in various manners depending upon the predefined design language of the at least one element. Also disclosed herein is a method for automatically selecting and arranging a plurality of original background layouts for use in a multi-page photo layout through use of a theme grammar for the plurality of original background layouts.

The original background layout may be, for instance, a border for a photograph, postcard, newsletter, or the like, and includes at least one element, such as, a design element, a border element, a repeating pattern element, a texture element, etc. In addition, the original background layout may be stored as a data file in any suitable format, for instance, vector format, such as, a .pdf, .svg., vml., etc., or bitmap format, such as, .png, tiff, .psd, etc. The data file of the original background layout may be stored on any suitable data source including, for example, a folder on a computer or other hardware device, a digital device memory card, an on-line website, etc.

The original background layout is designed by a designer or artist and is designed to fit into a particular page size or otherwise have specific dimensions. Disclosed herein are methods of automatically scaling the original background layout while maintaining the designer's or artist's original design intent of the original design. Also disclosed herein are methods for automatically selecting background layouts for multi-page collections, such as, a photo-book or photo album, that also maintains the designer's or artist's original design intent.

Figure 1:
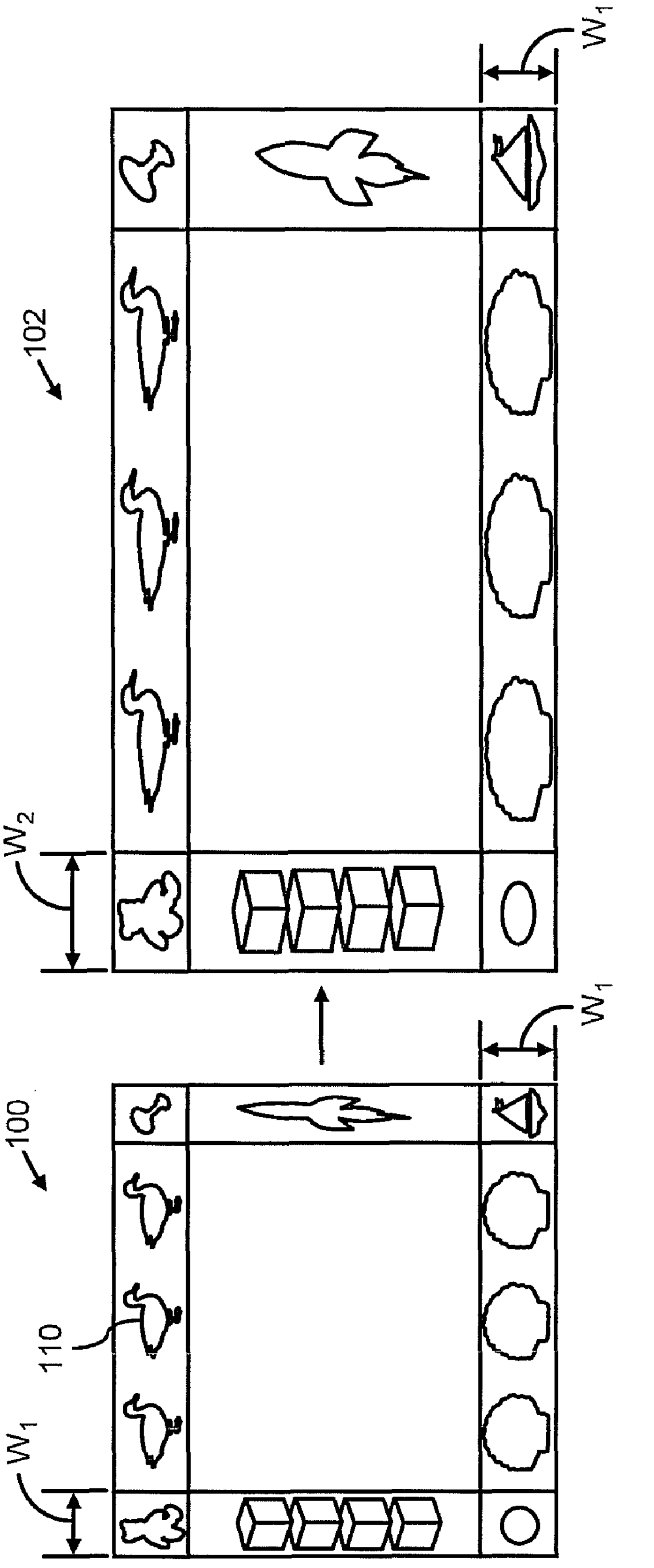
FIG. 1 (PRIOR ART)
FIG. 1 shows a conventional method for automatically resizing a digital image.
Figure 2:
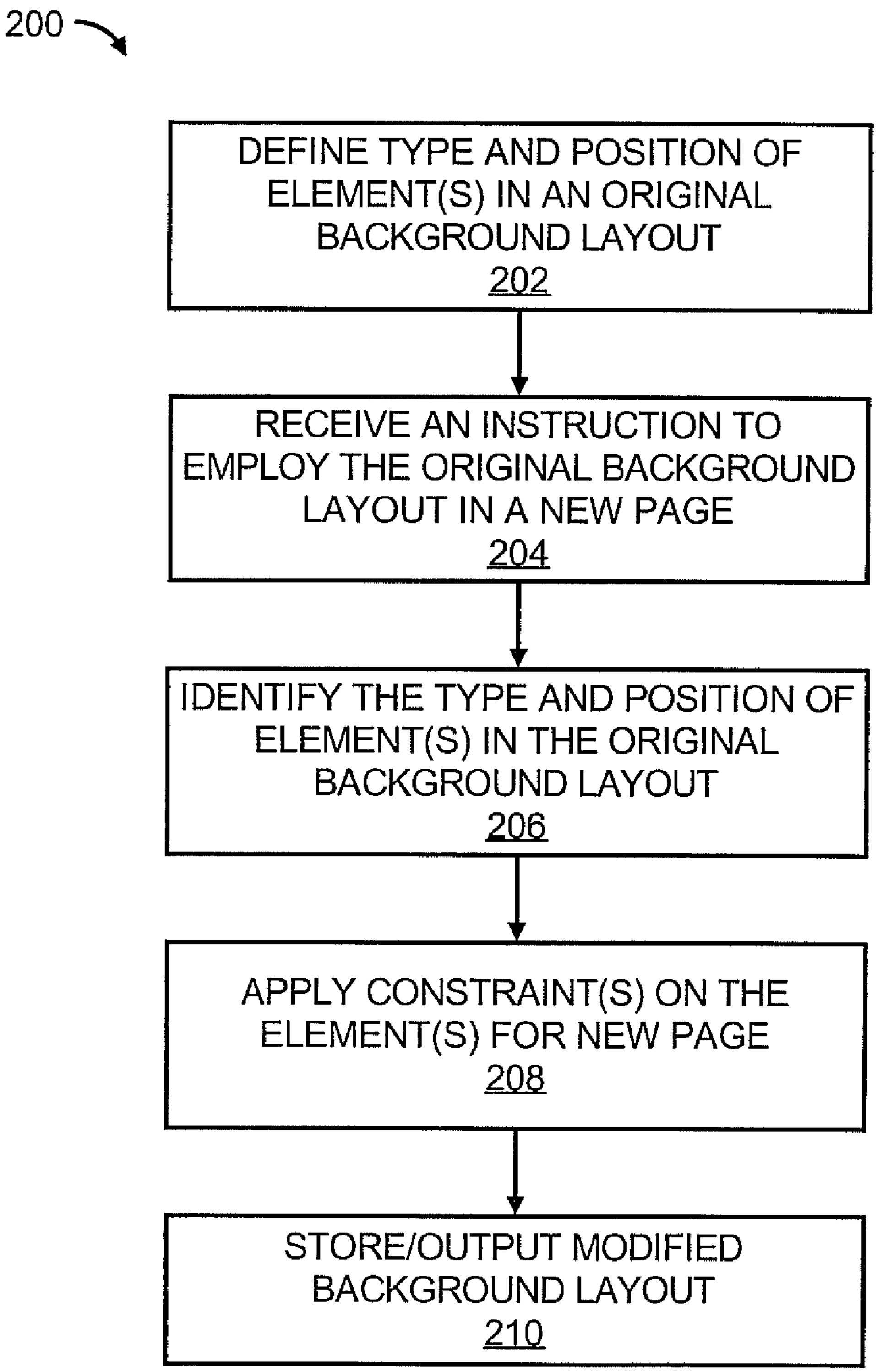
FIG. 2 shows a flow diagram of a method for dynamically scaling an original background layout having at least one element, in which, the element(s) is defined as having a type according to a predetermined design language and wherein a position of the element(s) is defined, according to an embodiment of the invention.

With reference first to FIG. 2, there is shown a flow diagram of a method 200 for dynamically scaling an original background layout having at least one element, in which, the element(s) is defined as having a type according to a predetermined design language and wherein a position of the element(s) is defined, according to an example. It should be apparent to those of ordinary skill in the art that the method 200 represents a generalized illustration and that other steps may be added or existing steps may be removed, modified or rearranged without departing from a scope of the method 200.

At step 202, the type and position of the element(s) in the original background layout are defined. The type of the element(s) defines how the element(s) may be scaled when the size and/or aspect ratio of the page for the background layout changes. The position of the element(s) defines how the placement of the element(s) may be varied when the size and/or aspect ratio of the page for the background layout changes. The position of the element(s) may be defined as the geometric layout position of the element(s) and, in certain instances, the position of the element(s) with respect to one or more other elements and relative to the whole page.

The type and position of the element(s) are defined based upon a predetermined design language. According to an example, the predetermined design language defines the type of the element(s) in the original background design as being stretchable (background), non-stretchable (foreground) or extensible. Stretchable (background) elements comprise those elements whose sizes may be varied without maintaining the aspect ratio of the original image. The predetermined design language may further define the stretchable (background) elements as being simple stretchable or complex stretchable. Simple stretchable elements comprise those stretchable elements that may be resized by simply scaling in the horizontal and vertical directions to achieve a desired dimension. An example of a simple stretchable element is a solid colored background. As discussed in greater detail herein below, the stretchable elements are not resized simply by following a page scaling factor, but instead, the stretchable elements are resized while attempting to preserve the distance of the stretchable elements to both edges of a new page.

Complex stretchable (background) elements comprise stretchable elements that typically may not be resized by simple scaling in the horizontal and vertical directions. Instead, complex stretchable elements may require more complex techniques to be scaled. Examples of suitable scaling techniques for complex stretchable elements include the "scale9" method and "seam carving" with defined constraints. Examples of complex stretchable elements include a picture frame with even thickness around four sides, a tree, a light wire extending through a page, etc.

Non-stretchable (foreground) elements comprise those elements whose original aspect ratio is required to be preserved in order to retain the design intent of the original image. Examples of non-stretchable elements comprise objects, such as, images of birds, flowers, computers, cars, etc.

Extensible elements comprise patterned elements, in which, additional similar patterns may be added or subtracted from the original image during resizing. Patterned elements may further be categorized as having a repeating texture that is a pattern that repeats over a certain area on a page and a complex texture that is a textured pattern with a certain level of randomness, which may require texture synthesis during an enlargement of the patterned element.

Although not explicitly shown in FIG. 2, a category of the element(s) may also be identified at step 202. The categories into which the element(s) may be classified include stretchable (background) element, non-stretchable (foreground) element, and extensible element. As discussed above, background elements are typically stretchable elements and foreground elements are typically nonstretchable elements. Texture elements and repeating pattern elements are typically extensible elements.

According to a first example, a designer or a user of the original background layout defines the type, position, and/or category of the element(s) contained in the original background layout. According to a second example, a computer-implemented application automatically defines the type, position, and/or category of the element(s) contained in the original background layout. In the second example, the computer-implemented application may apply any suitable method for distinguishing between the types of elements. For instance, the computer-implemented application may define the type and/or category of the element(s) based upon the position of the element(s) and other characteristics within the context of the original background layout. An example of a manner in which the non-stretchable (foreground) elements and the stretchable (background) elements may automatically be identified is described in the 2008/0095470 Patent Application Publication. According to a third example, a designer may define one or more of the type, position, and category and the computer-implemented application may define the remaining one(s) of the type, position, and category of the element(s), or vice versa.

The original background layout, including the type, position, and/or category of the element(s) contained in the original background layout may be stored as computer readable data files in a computer readable storage medium. The computer readable storage medium may comprise volatile and/or non-volatile memory, such as DRAM, EEPROM, MRAM, flash memory, and the like. In addition, or alternatively, the computer readable storage medium may comprise a device configured to read from and write to a removable media, such as, a floppy disk, a CD-ROM, a DVD-ROM, or other optical or magnetic media.

Figure 3:
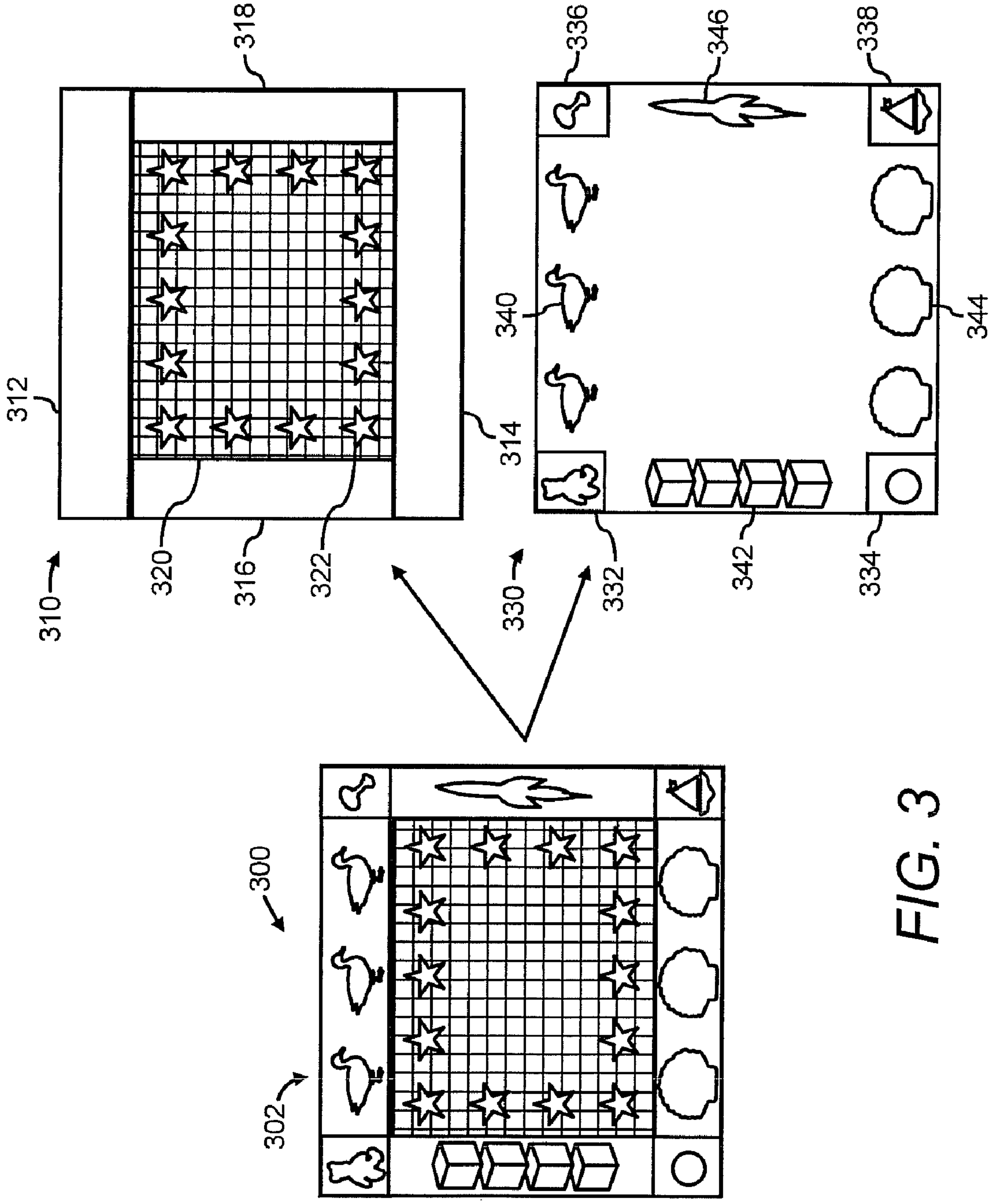
FIG. 3 illustrates a graphical depiction of background image elements and foreground image elements in an original background layout, according to an embodiment of the invention.

In any regard, with particular reference to FIG. 3, there is shown a graphical depiction of an original background layout 300 having a plurality of elements labeled generally as reference numeral 302, according to an example. It should be understood that the graphical depiction of the original background layout 300 is for purposes of illustration only and is not intended to limit the present invention in any respect.

As shown therein, the original background layout 300 may be broken down into its constituent parts as shown in the background image 310 and the foreground image 330. The background image 310 is shown as including a top border element 312, a bottom border element 314, a left side border element 316, a right side border element 318, a texture element 320, and repeating pattern elements 322. The foreground image 330 is depicted as including a top-left corner element 332, a bottom-left corner element 334, a top-right corner element 336, a bottom-right corner element 338, top foreground elements 340, a left side foreground element 342, bottom foreground elements 344, and a right side foreground element 346.

In terms of the predetermined design language, the border elements 312-318 may be defined as comprising simple stretchable elements, the texture element 320 and the repeating pattern elements 322 may be defined as comprising extensible elements, and the elements 332-346 depicted in the foreground image 330 may be defined as non-stretchable elements. This nomenclature will be used throughout the present disclosure in describing the various elements contained in an original background layout 300.

With reference back to FIG. 2, at step 204, an instruction to employ the original background layout in a new page is received. The instruction may specify the desired dimensions and/or aspect ratio of the new page, which may or may not be equivalent to the dimensions and/or aspect ratio of the original background layout. In instances where the new page dimensions and/or aspect ratio are equivalent to the dimensions of the page containing the original background layout, the original background layout may be used without modification, and the method 200 may end.

However, in instances where the new page dimensions and/or aspect ratio are not equivalent to the dimensions and/or aspect ratio of the page containing the original background layout, the type and position of each of the element(s) 302 in the original background layout 300 are identified at step 206. As discussed above, the type and position of the element(s) 302 may be user-defined or they may automatically be defined based upon various characteristics, such as, the relative complexity of the element(s), the repetition of the element(s), etc., of the element(s) in the context of the original background layout 300.

Figure 5:
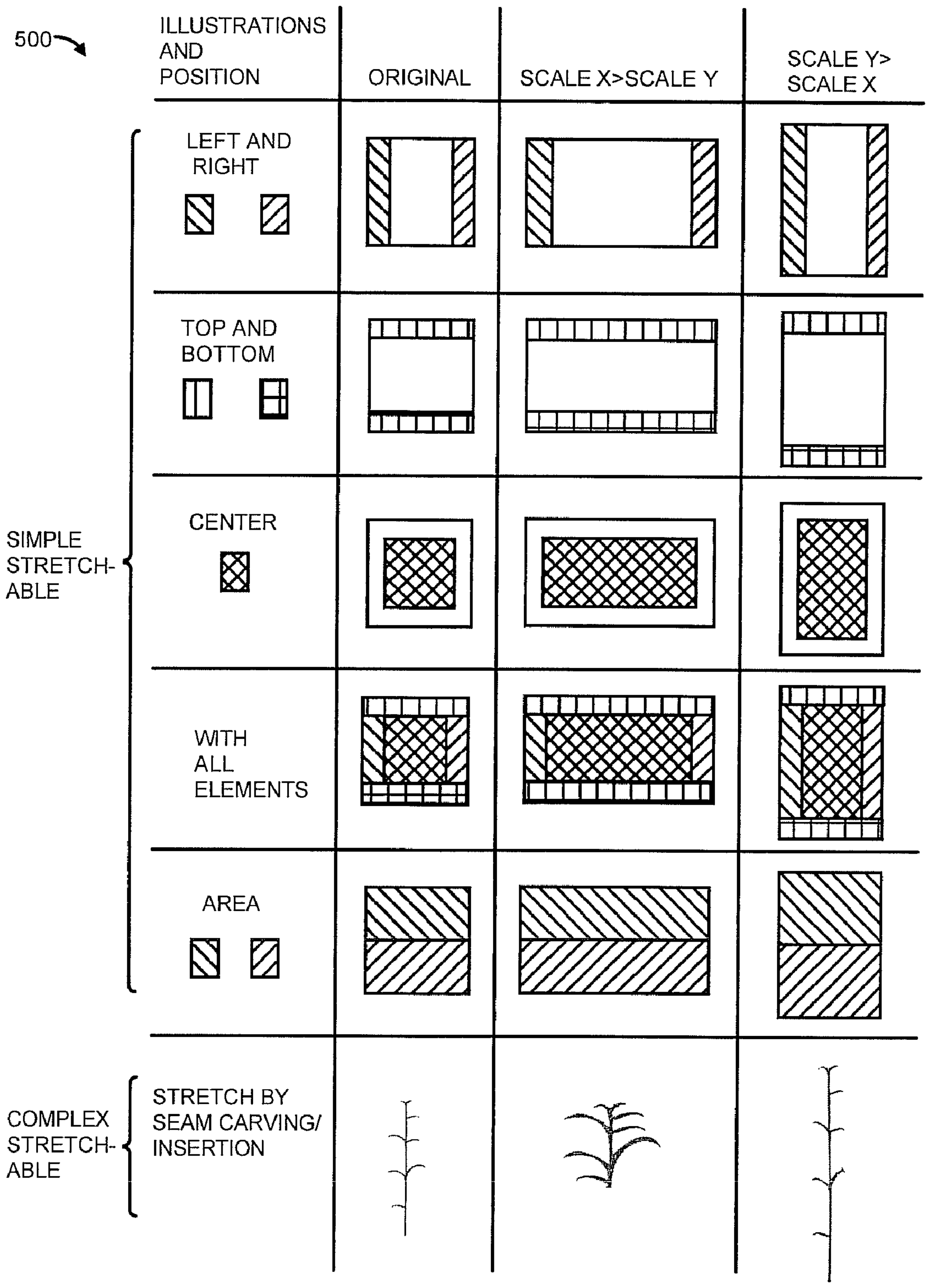
FIG. 5 shows a diagram of various manners in which simple stretchable elements and complex stretchable elements may be resized, according to an embodiment of the invention.
Figure 6:
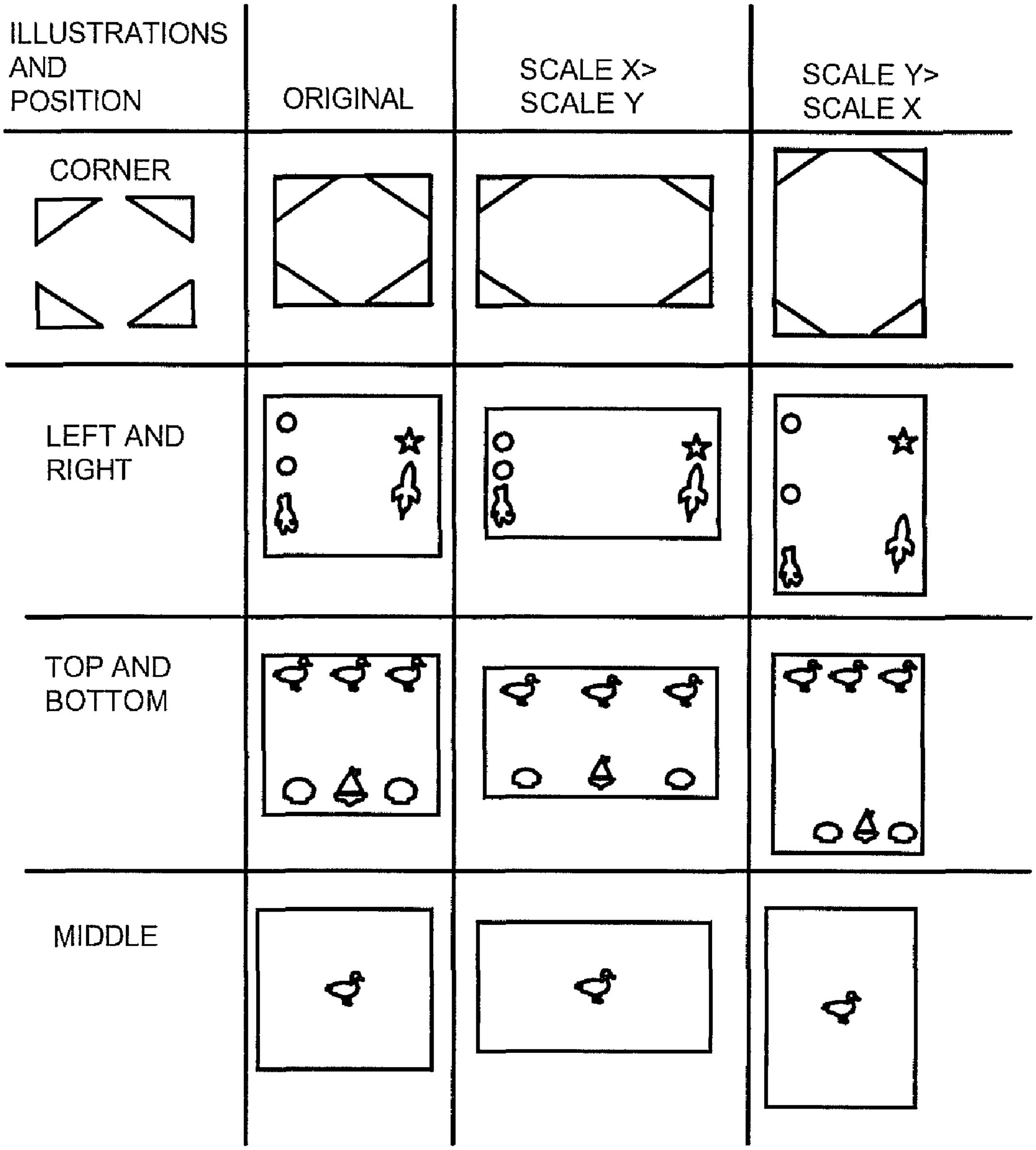
FIG. 6 shows a diagram of various manners in which non-stretchable elements may be resized, according to an embodiment of the invention.
Figure 7:
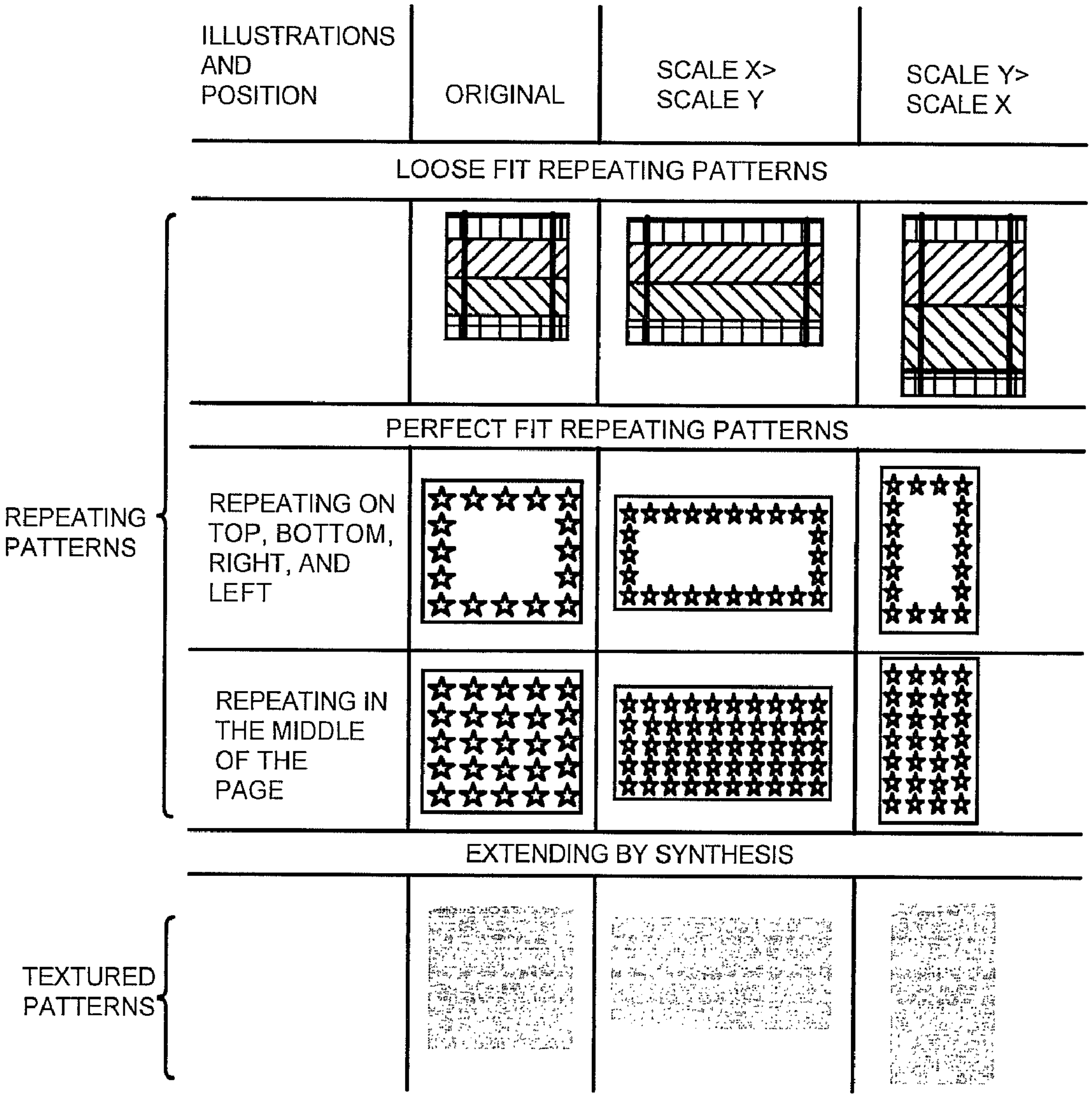
FIG. 7 shows a diagram of various manners in which extensible elements may be resized, according to an embodiment of the invention.

At step 208, one or more constraints are applied on at least one characteristic of the element(s) 302 to modify the characteristic(s) of the element(s) 302 for inclusion in the new page based upon the constraint(s), in which the constraint(s) are based upon the type and position of the element(s). The characteristic(s) of the element(s) include horizontal size, vertical size, position, extensibility, and repeatability. In addition, the one or more constraints define how one or more of the characteristics are to be modified based upon the type and position of the element(s) 302. Various manners in which modifications to the characteristic(s) of the element(s) 302 are constrained depending upon its type and positioned are described in greater detail herein below with respect to FIG. 4 and graphical examples of the modifications are depicted in FIGS. 5-7. In any regard, application of the constraint(s) results in a modified background layout that is suitable for the new page. More particularly, the modified background layout is sized to fit the new page while maintaining the design intent of the original background layout.

At step 210, the modified background layout is stored or outputted. The modified background layout may be stored on a computer-readable storage medium, such that, a photo image may be included in the modified background layout. As another example, the modified background layout may be outputted to a printing device to be printed alone or with a photo image.

Figure 4:
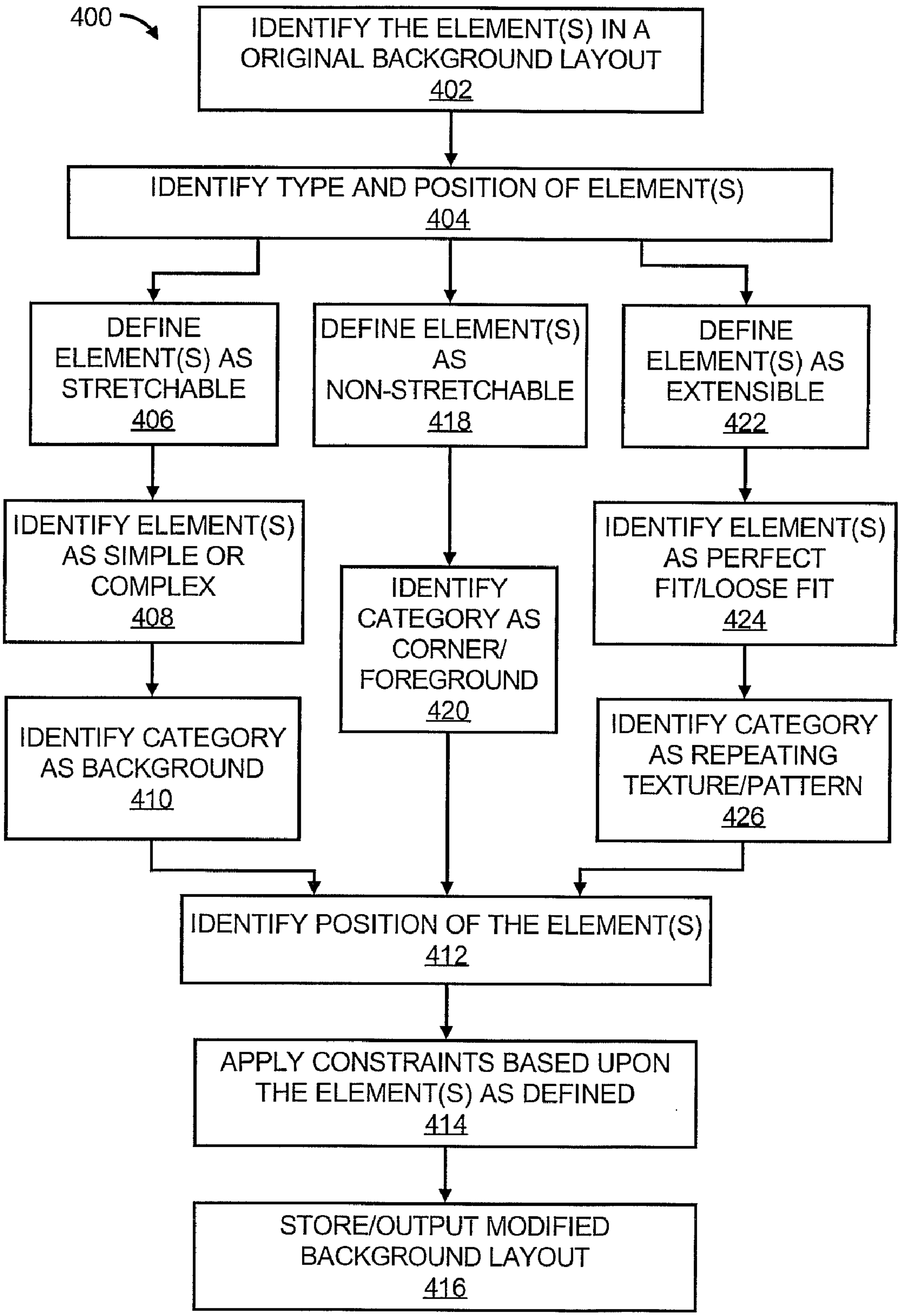
FIG. 4 shows a flow diagram of a method for dynamically scaling an original background layout having at least one element, in which, the element(s) is defined as having a type according to a predetermined design language and wherein a position of the element(s) is defined, according to an embodiment of the invention.

Turning now to FIG. 4, there is shown a flow diagram of a method 400 for dynamically scaling an original background layout having at least one element, in which, the element(s) is defined as having a type according to a predetermined design language and wherein a position of the element(s) is defined, according to an example. It should be apparent to those of ordinary skill in the art that the method 400 represents a generalized illustration and that other steps may be added or existing steps may be removed, modified or rearranged without departing from a scope of the method 400.

The method 400 is similar to the method 200 depicted in FIG. 2, but differs from the method 200 in that it provides a more detailed discussion of some of the steps discussed in the method 200. In addition, the method 400 is considered to be performed following receipt of an instruction to employ the original background layout 300 in a new page having at least one different dimension compared with the dimensions of the original background layout 300.

At step 402, the element(s) 302 contained in the original background layout 300 are identified. At step 404, the type and position of the element(s) 302 are identified. In one example, the type and position of the element(s) 302 may be identified by a designer or a user of the original background layout 300. In another example, the type and position of the element(s) 302 may automatically be identified by a computer-implemented application. In a yet further example, the type and position of the element(s) 302 may be identified by both a user and a computer-implemented application.

Following step 404, if the element(s) 302 is identified as comprising a stretchable (background) element, the element(s) 302 is defined as being a stretchable (background) element at step 406. In addition, at step 408, the element(s) 302 is identified as being a simple stretchable or a complex stretchable element.

The top border element 312, the bottom border element 314, the left side border element 316, and the right side border element 318 in the background image 310 in FIG. 3 are examples of simple stretchable elements. An illustration of a tree (FIG. 5), a flower, or other object that require application of relatively more complex algorithms, such as, seam carving, for its size to be changed while maintaining desired design intents are examples of complex stretchable elements.

At step 412, the position of the element(s) 302 in the original background layout 300 is identified. The position of the element(s) 302 may be considered as being one of top, bottom, right, left, center, area, and positions between those particular positions, such as, bottom-right, left-center, etc. An element(s) 302 having an area position is considered to cover a relatively large section of the page.

At step 414, one or more constraints are applied on the element(s) 302 based upon the element(s) 302 as defined to resize/reposition the element(s) 302 in the new page based upon the application of the one or more constraints. Different constraints are applied on the stretchable (background) element(s) 302 based upon the size and the position in the new page in order to preserve the original design intent of the original background layout 300. For instance, for an element(s) 302 defined as having an area position, a resizing constraint will cause the height and the width of the element 302 to be scaled proportionally with the page. As another example, for elements 302 with positions of left, right, top, or bottom, a resizing constraint is to preserve the relative distance to their respective edges of the page. As a further example, for elements 302 defined as having a center position, a resizing constraint is to preserve its distance to all of the edges of the page.

According to a particular example in which a gap is present between an end of a stretchable element 302 and an edge of the page for the original background layout 300, a resizing constraint is to size the stretchable element 302 for the new page such that a gap between the stretchable element 302 and the edge of the new page is proportional to the original gap according to the smaller of a horizontal scaling factor and a vertical scaling factor between the original background layout 300 and the new page. More particularly, a size of the original gap between the end of the stretchable element 302 and an edge of the page for the original background layout 300 is determined. Also determined is a horizontal scaling factor and a vertical scaling factor of the new page with respect to the original background layout, and a determination as to which of the horizontal scaling factor and the vertical scaling factor is smaller is made. In addition, the element(s) 302 is sized to maintain the gap in the new page as discussed above.

Examples of various manners in which simple stretchable and complex stretchable elements 302 may be resized are provided in the diagram 500 depicted in FIG. 5.

In addition, at step 416, the modified background layout for the new page is stored or outputted. The modified background layout may be stored on a computer-readable storage medium, such that, a photo image may be included in the modified background layout. As another example, the modified background layout may be outputted to a printing device to be printed alone or with a photo image.

With reference back to step 404, if the element(s) 302 is identified as comprising a non-stretchable (foreground) element, the element(s) 302 is defined as being a non-stretchable (foreground) element at step 418. In addition, the element(s) 302 is further identified as having a category of either corner or foreground, as indicated at step 420.

Examples of non-stretchable (corner) elements 332-338 and non-stretchable (foreground) elements 340-346 are depicted in the foreground image 330 of FIG. 3. At step 412, the position of the element(s) 302 in the original background layout 300 is identified and may be one of top, bottom, right, left, center, and positions between those particular positions, such as, bottom-right, left-center, etc.

At step 414, one or more constraints are applied on the element(s) 302 based upon the element(s) 302 as defined to resize/reposition the element(s) 302 in the new page based upon the application of the one or more constraints. A resizing constraint on the non-stretchable (foreground) elements 302 is to maintain the original aspect ratio in the new page. Thus, for instance, the non-stretchable (foreground) elements 302 may be resized to be proportional to a smaller of a horizontal scaling factor and a vertical scaling factor between the new page and the original background layout 300.

A placement constraint on the non-stretchable (foreground) elements 302 is based upon its position attribute. For instance, one option is to preserve the relative distance of the non-stretchable (foreground) elements 302 in one dimension between the original background layout 300 and the new page. Another option is to preserve the ratio of its distances to two opposite edges of the page.

By way of example, the scaling factor for a non-stretchable (foreground) element(s) 302 that is positioned on a left side of the original background layout 300 is the smaller one of the horizontal and vertical scaling factors. A constraint on the new position of the non-stretchable (foreground) element(s) 302 is that the element(s) 302 is required to preserve the relative distance between the right edge of the element(s) 302 to the left edge of the new page, that is, the new distance is required to be proportional to the original distance between element(s) 302 to the left edge of the original background layout 300. Another constraint on the new position of the non-stretchable (foreground) element(s) 302 is that the element(s) 302 is required preserve the ratio of the distance between its distance to the top and to the bottom of the original background layout 300.

Examples of various manners in which non-stretchable (foreground) elements 302 may be resized are provided in the diagram 600 depicted in FIG. 6.

In addition, at step 416, the modified background layout for the new page is stored or outputted in any of the manners discussed above.

With reference back to step 404, if the element(s) 302 is identified as comprising an extensible element, the element(s) 302 is defined as being an extensible element at step 422. As discussed above, extensible elements comprise patterned elements that, when resized, may include the addition of similar pattern elements or the subtraction of existing elements. In addition, the element(s) is further identified as simple extensible (or simple repeating pattern) and complex extensible (or complex repeating pattern, such as, a textured pattern). Simple extensible element(s) 302 is further identified as being a perfect fit element or a loose fit element, at step 424. A perfect fit element may be defined as an element in which a repeating pattern having an integer number of the elements may be provided in the new page. As such, with perfect fit elements, the distance between the elements may be adjusted to fill a predetermined area of the new page. A loose fit element may be defined as an element that fills up a predetermined region with a fixed gap until all of the space is filled. In addition, a loose fit element may be partially cut out by the edge of the region. The extensible elements may be extended in the horizontal and/or vertical directions when filling the predetermined area. In addition, the extensible elements may be extended along a line or a curve when filling the predetermined area.

In addition, the extensible element(s) 302 is further identified as having a category of a repeating pattern or a repeating texture, as indicated at step 426. Examples of a repeating pattern 322 and a repeating texture 320 are depicted in the background image 310 in FIG. 3. As shown therein, the repeating texture 320 contains a certain level of randomness and enlarging the repeating texture thus requires texture synthesis.

At step 412, the position of the element(s) 302 in the original background layout 300 is identified and may be one or more of top, bottom, right, left, center, area, and positions between those particular positions, such as, bottom-right, left-center, etc.

At step 414, one or more constraints are applied on the element(s) 302 based upon the element(s) 302 as defined to resize/reposition and/or add or remove the element(s) 302 in the new page based upon the application of the one or more constraints. For instance, similar constraints to those discussed above with respect to the stretchable and non-stretchable elements may be applied to loose fit extensible elements 302. As another example, for repeating patterns, the pattern itself is constrained in similar manners as non-stretchable elements and the area that is to be covered by the repeating pattern in the new page is calculated in similar manners as the stretchable elements. In addition, for a pattern element, one of multiple elements 302 may be selected for placement on the new page to create a random effect. For a complex texture element, the one or more constraints may require that a texture synthesis operation be performed to enlarge the element 302 in one or more dimensions.

Examples of various manners in which extensible elements 302 may be resized are provided in the diagram 700 depicted in FIG. 7.

In addition, at step 416, the modified background layout for the new page is stored or outputted in any of the manners discussed above.

Figure 8:
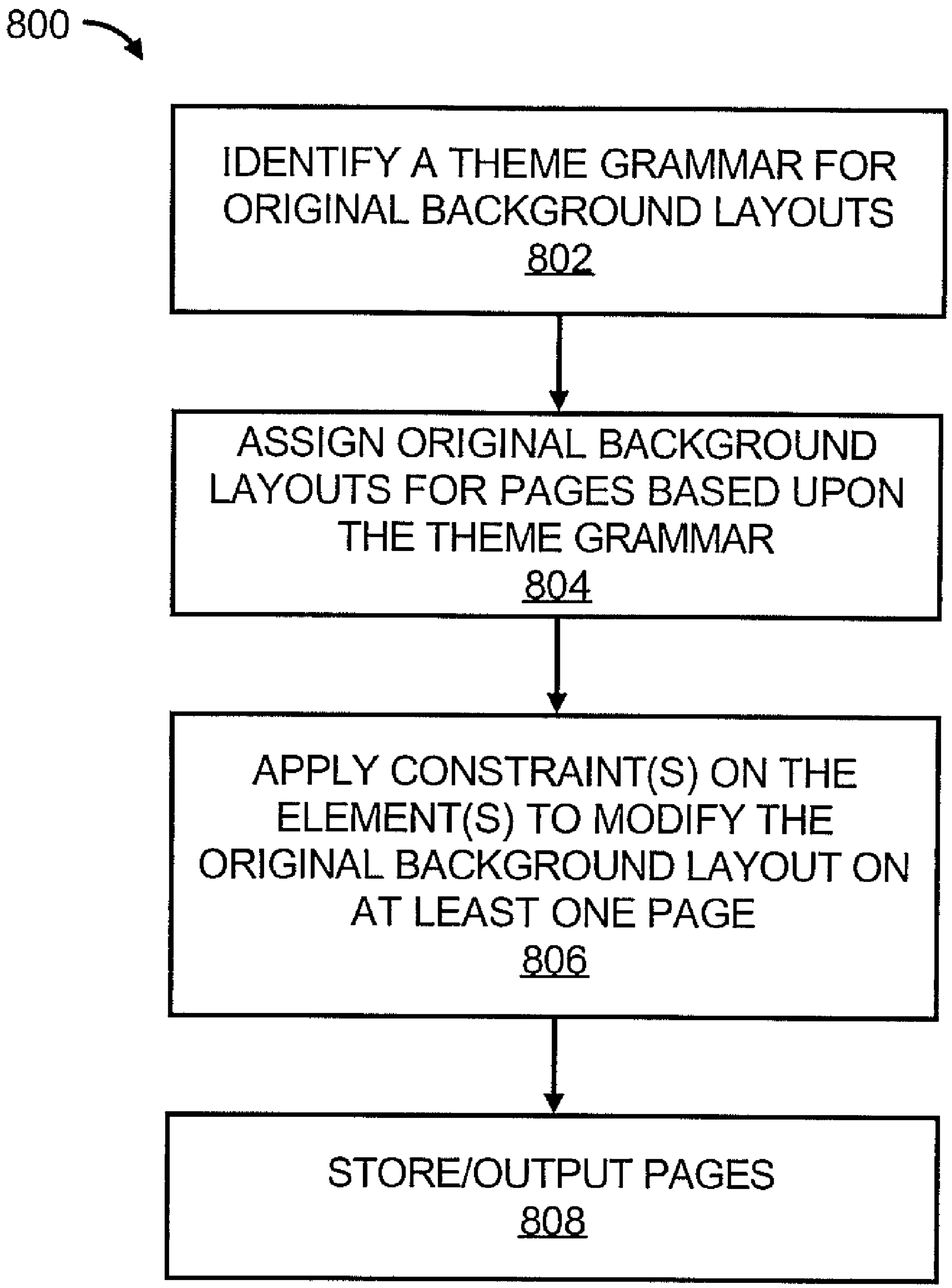
FIG. 8 shows a flow diagram of a method for automatically selecting and arranging a plurality of original background layouts for use in a multi-page photo layout, according to an embodiment of the invention.

Turning now to FIG. 8, there is shown a flow diagram of a method 800 for automatically selecting and arranging a plurality of original background layouts for use in a multi-page photo layout, according to an example. It should be apparent to those of ordinary skill in the art that the method 800 represents a generalized illustration and that other steps may be added or existing steps may be removed, modified or rearranged without departing from a scope of the method 800.

According to an example, the method 800 may be performed in conjunction with the method 400 depicted in FIG. 4. For instance, the method 800 may be performed to automatically identify a plurality of original background layouts 300 that are modified for variously sized pages in the multi-page photo layout, as discussed above with respect to the method 400. It should however, be understood that the method 800 may also be performed independently of the method 400 without departing from a scope of the method 800.

At step 802, a theme grammar for the original background layouts 300 is identified. Generally speaking, the theme grammar specifies usage constraints for the plurality of original background layouts 300. The usage constraints define suitability of the original background layouts 300 for text display, the appropriate color of text to be included in the original background layouts 300, suitability of the original background layouts 300 for a multiple-photo layout, whether the original background layouts 300 are suitable for placement on a right or a left side of a page spread, which of the original background layouts 300 are compatible with each other on facing pages, and the relative frequency of appearance to target for each of the original background layouts, etc.

Thus, according to a particular example, the theme grammar for a particular original background layout 300 defines its relation with contents on the page, such as suitability for text, appropriate text color, and whether the background is designed for a single image or multiple images on the page; as well as its relation with other pages in the collection, such as whether it is suitable as a left or right side page, which of the other original background layouts 300 may be placed on an opposite page on a page, and its relative frequency of appearance in the collective relative to other backgrounds.

At step 804, the original background layouts 300 are assigned to the pages of the multi-page photo layout based upon the constraints defined in the theme grammar.

Optionally, at step 806, one or more of the original background layouts 300 may be modified through application of one or more constraints on the elements contained in the original background layout(s) 300. Step 806 is considered to be optional because the original background layout(s) 300 may not be modified in instances where the original background layouts 300 have the correct dimensions for the photo layout. Thus, for instance, step 806 may be performed for those original background layouts 300 that need to be re-sized for the photo layout. In instances where step 806 is performed, those original background layouts 300 may be modified as discussed above with respect to the method 400 in FIG. 4.

At step 808, the pages of the photo layout containing the original background layouts 300 may be stored and/or outputted. The background layouts may be stored on a computer-readable storage medium, such that, photo images may be included in the background layouts. As another example, the background layouts 300 may be outputted to a printing device to be printed alone or with photo images.

Some or all of the operations set forth in the methods 200, 400, and 800 may be contained as a utility, program, or subprogram, in any desired computer accessible medium. In addition, the methods 200, 400, and 800 may be embodied by computer programs, which can exist in a variety of forms both active and inactive. For example, they may exist as software program(s) comprised of program instructions in source code, object code, executable code or other formats. Any of the above may be embodied on a computer readable medium, which include storage devices.

Exemplary computer readable storage devices include conventional computer system RAM, ROM, EPROM, EEPROM, and magnetic or optical disks or tapes. Concrete examples of the foregoing include distribution of the programs on a CD ROM or via Internet download. It is therefore to be understood that any electronic device capable of executing the above-described functions may perform those functions enumerated above.

Figure 9:
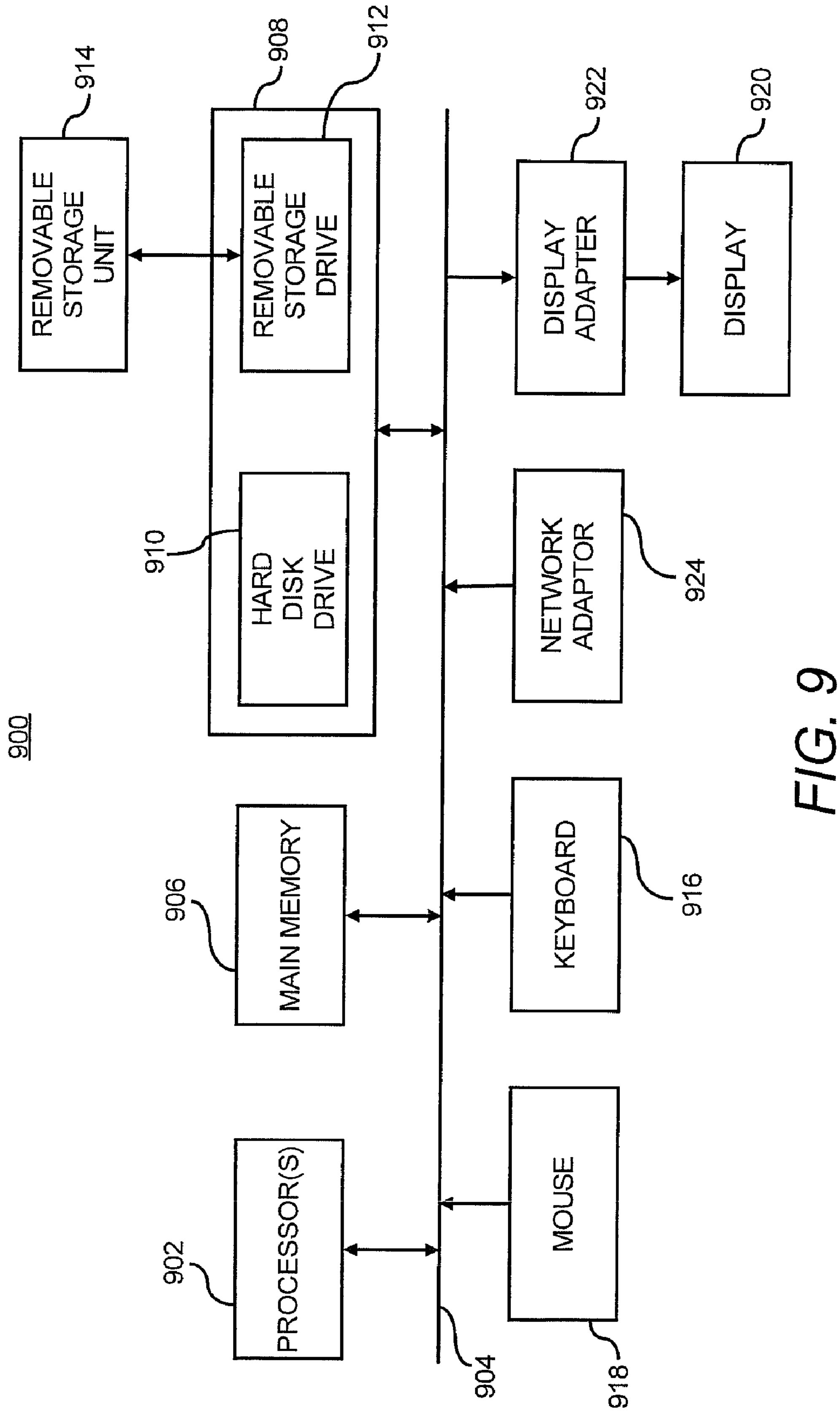
FIG. 9 shows a block diagram of a computing apparatus configured to implement or execute one or more of the methods depicted in FIGS. 2, 4, and 8, according to an embodiment of the invention.

FIG. 9 illustrates a block diagram of a computing apparatus 900 configured to implement or execute one or more of the method 200, 400, and 800 stored on a computer readable storage medium, according to an example. The computing apparatus 900 includes a processor 902 that may implement or execute some or all of the steps described in one or more of the methods 200, 400, and 800. Commands and data from the processor 902 are communicated over a communication bus 904. The computing apparatus 900 also includes a main memory 906, such as a random access memory (RAM), where the program code for the processor 902, may be executed during runtime, and a secondary memory 908. The secondary memory 908 includes, for example, one or more hard disk drives 910 and/or a removable storage drive 912, representing a floppy diskette drive, a magnetic tape drive, a compact disk drive, etc., where a copy of the program code for one or more of the methods 200, 400, and 800 may be stored.

The removable storage drive 910 reads from and/or writes to a removable storage unit 914 in a well-known manner. User input and output devices may include a keyboard 916, a mouse 918, and a display 920. A display adaptor 922 may interface with the communication bus 904 and the display 920 and may receive display data from the processor 902 and convert the display data into display commands for the display 920. In addition, the processor(s) 902 may communicate over a network, for instance, the Internet, LAN, etc., through a network adaptor 924.

It will be apparent to one of ordinary skill in the art that other known electronic components may be added or substituted in the computing apparatus 900. It should also be apparent that one or more of the components depicted in FIG. 9 may be optional (for instance, user input devices, secondary memory, etc.).

What has been described and illustrated herein is a preferred embodiment of the invention along with some of its variations. The terms, descriptions and figures used herein are set forth by way of illustration only and are not meant as limitations. Those skilled in the art will recognize that many variations are possible within the scope of the invention, which is intended to be defined by the following claims—and their equivalents—in which all terms are meant in their broadest reasonable sense unless otherwise indicated.

What is claimed is:

1. A method for dynamically scaling an original background layout having at least one element, wherein the at least one element is defined as having a type according to a predetermined design language and wherein a position of the at least one element is defined, said method comprising:

receiving an instruction to employ the original background layout in a new page that differs in at least one of size and aspect ratio from the original background layout;

detecting for presence of an element type of the original background layout, wherein the element type is identifiable as a simple stretchable element, a complex stretchable element, an element having a perfect fit simple repeating pattern, an element having a loose fit simple repeating pattern, an element having a complex repeating pattern comprising a level of randomness, and a non-stretchable element;

identifying the position of the at least one element; and automatically applying, by a processor, one or more constraints on at least one characteristic of the at least one element to modify the at least one characteristic of the at least one element for inclusion in the new page, wherein the one or more constraints are based upon the type and position of the at least one element.

2. The method according to claim 1, further comprising:

identifying a category of the at least one element, wherein the category comprises a background element, a foreground element, a texture element, and a repeating pattern element; and wherein applying the one or more constraints further comprises applying the one or more constraints based upon the identified category of the at least one element.

3. The method according to claim 2, further comprising:

in response to the at least one element comprising a stretchable type and having at least one original gap between an end of the at least one element and an edge of the original background layout, determining a size of the original gap;

determining a horizontal scaling factor and a vertical scaling factor of the new page with respect to the original background layout;

determining which of the horizontal scaling factor and the vertical scaling factor is smaller; and sizing the at least one element to cause a gap in the new page to be proportional to the original gap according to the smaller of the horizontal scaling factor and the vertical scaling factor.

4. The method according to claim 2, further comprising:

in response to the at least one element comprising a complex stretchable type, resizing the at least one element through application of an application that resizes the at least one element by varying features other than scaling by an aspect ratio of the at least one element.

5. The method according to claim 2, further comprising:

in response to the at least one element comprising a non-stretchable type, defining the category of the at least one element as being a foreground element and having a position of one of top, bottom, left, right, top left, bottom left, top right, and bottom right.

6. The method according to claim 2, wherein the original background layout comprises a plurality of elements, said method further comprising:

in response to the plurality of elements comprising perfect fit simple repeating pattern elements, adjusting spaces between the plurality of elements to fit a maximum integer number of elements within the new page.

7. The method according to claim 2, wherein the original background layout comprises a plurality of elements, said method further comprising:

in response to the plurality of elements comprising loose fit simple repeating pattern elements, adding elements onto the new page until additional space is unavailable in the new page.

8. The method according to claim 1, wherein receiving the instruction further comprises receiving an instruction to employ a plurality of original background layouts in a plurality of pages, said method further comprising:

identifying a theme grammar for the plurality of original background layouts, wherein the theme grammar specifies usage constraints for the plurality of original background layouts; and assigning the plurality of original background layouts for each of the plurality of pages based upon the theme grammar.

9. A non-transitory computer readable storage medium on which is stored computer readable data files, said data files defining an original background layout having at least one element, said computer readable data files comprising a set of instructions to:

receive an instruction to employ the original background layout in a new page that differs in at least one of size and aspect ratio from the original background layout;

detect for presence of an element type of the original background layout, wherein the element type is identifiable as a simple stretchable element, a complex stretchable element, an element having a perfect fit simple repeating pattern, an element having a loose fit simple repeating pattern, an element having a complex repeating pattern comprising a level of randomness, and a non-stretchable element;

identifying a position of the at least one element; and automatically apply one or more constraints on at least one characteristic of the at least one element to modify the at least one characteristic of the at least one element for inclusion in the new page, wherein the one or more constraints are based upon the type and position of the at least one element.

10. The non-transitory computer readable storage medium according to claim 9, said computer readable data files further comprising a set of instructions to:

define a category of the at least one element, wherein the category comprises a background element, a foreground element, a texture, and a repeating pattern; and wherein the code defining how the at least one element is to be at least one of resized and repositioned further comprises code defining how the at least one element is to be at least one of resized and repositioned based upon the identified category of the at least one element.

11. The non-transitory computer readable storage medium according to claim 9, a designer of the original background layout is to identify the type and the position of the at least one element.

12. The non-transitory computer readable storage medium according to claim 9, further comprising a set of instructions to define multiple manners in which the at least one element is to be at least one of resized and repositioned based upon different types and positions of elements.

13. The non-transitory computer readable storage medium according to claim 9, wherein the data files define a plurality of original background layouts, said computer readable data files further comprising a set of instructions to:

define a theme grammar for the plurality of original background layouts, wherein the theme grammar specifies usage constraints for the plurality of original background layouts when assigned to a collection of pages.

14. A method for automatically selecting and arranging a plurality of original background layouts for use in a multi-page photo layout, said method comprising:

identifying, by a processor, a theme grammar for the plurality of original background layouts comprising at least one element, wherein the theme grammar specifies constraints for the plurality of original background layouts within a collection of pages;

assigning the plurality of original background layouts to the plurality of pages in the collection based upon the constraints specified by the theme grammar, wherein at least one usage constraint specified by the theme grammar is based upon use of the original background layouts in a multi-page photo layout;

detecting for presence of an element type for the at least one element within at least one of the plurality of original background layouts, wherein the element type is identifiable as a simple stretchable element, a complex stretchable element, an element having a perfect fit simple repeating pattern, an element having a loose fit simple repeating pattern, an element having a complex repeating pattern comprising a level of randomness, and a non-stretchable element;

identifying a position of the at least one element; and automatically applying one or more of the constraints on at least one characteristic of the at least one element to modify the at least one characteristic of the at least one element for inclusion in a modified background layout, wherein the one or more constraints are based upon the type and position of the at least one element.

15. The method according to claim 14, wherein the theme grammar specifies usage constraints pertaining to at least one of suitability for text display, suitability for multiple-photo layout, appropriate text color, whether the background is designed for a single image or for multiple images on a page, suitability of the background in relation with other pages in the collection, whether the background is suitable to be placed on a right or a left side of a page spread, which backgrounds are compatible with each other on facing pages, and the relative frequency of appearance to target for each of the backgrounds in the collection.

* * * * *

UNITED STATES PATENT AND TRADEMARK OFFICE

CERTIFICATE OF CORRECTION

PATENT NO. : 8,386,957 B2
APPLICATION NO. : 12/392516
DATED : February 26, 2013
INVENTOR(S) : Hui Chao et al.

It is certified that error appears in the above-identified patent and that said Letters Patent is hereby corrected as shown below:

In the Claims

In column 12, line 32, in Claim 11, delete "a designer" and insert -- wherein a designer --, therefor.

Signed and Sealed this
Fourth Day of June, 2013

Teresa Stanek Rea
*Acting Director of the United States Patent and Trademark Office*